United States Patent [19]

Temple et al.

[11] Patent Number: 5,411,134
[45] Date of Patent: May 2, 1995

[54] CONTAINER FOR COMPACT DISKS AND THE LIKE

[75] Inventors: James M. Temple; James A. Bergh, both of Boulder; Robert P. Stanley, Longmont, all of Colo.

[73] Assignee: Case Logic, Inc., Longmont, Colo.

[21] Appl. No.: 175,704

[22] Filed: Dec. 30, 1993

[51] Int. Cl.[6] .......................................... B65D 85/57
[52] U.S. Cl. ......................... 206/45.13; 206/45.15; 206/309; 220/331
[58] Field of Search ............... 206/45.13, 45.15–45.18, 206/303, 307–313, 387, 444; 220/329, 331, 333

[56] References Cited

U.S. PATENT DOCUMENTS

| | | |
|---|---|---|
| 1,247,848 | 11/1917 | List . |
| 1,378,363 | 5/1921 | List . |
| 1,526,213 | 2/1925 | Humphrey . |
| 1,720,274 | 7/1929 | Holden . |
| 2,897,034 | 7/1959 | Kalen . |
| 3,783,999 | 1/1974 | Smith . |
| 4,420,079 | 12/1983 | Gliniorz et al. . |
| 4,496,050 | 1/1985 | Kirchner et al. . |
| 4,515,419 | 5/1985 | Hampel et al. . |
| 4,541,527 | 9/1985 | Nagel . |
| 4,634,001 | 1/1987 | Wakelin . |
| 4,666,036 | 5/1987 | Bourbon . |
| 4,676,375 | 6/1987 | Willems et al. . |
| 4,693,364 | 9/1987 | Wakelin . |
| 4,721,205 | 1/1988 | Burt et al. ........................... 206/317 |
| 4,735,309 | 4/1988 | Nemeth . |
| 4,776,457 | 10/1988 | Ferraroni . |
| 4,798,284 | 1/1989 | Wakelin . |
| 4,867,302 | 9/1989 | Takahashi . |
| 4,986,415 | 1/1991 | Posso . |
| 5,099,995 | 3/1992 | Karakane et al. . |
| 5,355,997 | 10/1994 | Kikuchi ........................... 206/45.13 |

Primary Examiner—Jimmy G. Foster
Attorney, Agent, or Firm—Francis A. Sirr; Jennifer L. Bales; Earl C. Hancock

[57] ABSTRACT

A container for storing compact disks and the like includes a box shaped base member that defines an open top and open front cavity for housing compact disks as the disks stand with their bottom edge engaging a floor of the cavity. A front panel closes the lower portion of front of the cavity. The front panel is pivoted adjacent to the floor of the cavity and carries a latch member at the top edge of the front panel. A mechanical detent provides two stable positions for the front panel, one position being a closed position and the other position being a pivoted open position. A generally L-shaped cover closes both the remainder of the cavity front and the cavity top. The bottom edge of the cover contains a slot that cooperates with the latch on the front panel, so as to lock the cover in a closed position. When the cover is so latched, a spring bias means is loaded to subsequently open the cover when the latch is manually released from the slot in the cover. The cover is slidably mounted to the two side walls of the cavity, each side wall of which contains an inverted U-shaped track and an elongated vertical groove. Cover movement is guided by these U-shaped tracks and vertical grooves.

17 Claims, 3 Drawing Sheets

CONTAINER FOR COMPACT DISKS AND THE LIKE

BACKGROUND OF THE INVENTION

1. Field of the Invention

This invention relates to a container for storing, carrying and displaying compact disks and the like.

2. Description of the Prior Art

Containers for storing, carrying and displaying compact disks and the like are known in the art. U.S. Pat. No. 5,099,995 by Karakane et al discloses a compact disk carrying case wherein the disks are contained in flexible pockets that either fan out or flip like pages of a book. U.S. Pat. No. 4,867,302 by Takahashi discloses a tape case which has a handle which rotates to release, and a center leaf that lifts the tape as the lid is lifted. U.S. Pat. No. 4,735,309 by Nemeth discloses a disk container with a front wall having three jointed panels. When the top panel is pivoted forward, the joint between the second and third panels comes forward and the third panel rests on the table. U.S. Pat. No. 4,496,050 by Kirchner et al discloses a disk case with a surface that lifts the disks when the cover is lifted.

Items such as boxes, instruments, etc. in which an integral part of the item pivots to become a stand are also known in the art. For example, U.S. Pat. No. 4,986,415 by Posso discloses a disk storage case wherein a lid pivots forward to prop up the case. U.S. Pat. No. 4,776,457 by Ferraroni discloses a container with a cover that is hinged at the top of the container, the cover rotating from the top of the container, up over the container top, to form a stand. U.S. Pat. No. 4,676,375 by Willems et al discloses a container whose front panel swings forward to become a stand. A semicircular slot cooperates with a semicircular ridge to form a guide. U.S. Pat. No. 4,541,527 by Nagel discloses a case having a U-shaped stand that pivots forward as a lid swings open. U.S. Pat. No. 4,515,419 by Hampel et al discloses an instrument with a cover plate that rotates down to become a stand. U.S. Pat. No. 4,420,079 by Gliniorz et al discloses a container for tape having a lid that pivots open and then slides back under the container body. U.S. Pat. No. 3,783,999 by Smith discloses a box with a lid which slides back, then rotates so that its back edge forms a stand. U.S. Pat. No. 2,897,034 by Kalen discloses an instrument case with a cover that rotates back to become a stand. U.S. Pat. No. 1,720,274 by Holden discloses a case with a lid that flips back to become a stand. U.S. Pat. No. 1,526,213 by Humphrey discloses a box with a lid that pivots open and then slides down to form a stand. U.S. Pat. Nos. 1,378,363 and 1,247,848, both by List, disclose boxes whose lids swing back to form stands.

Containers for compact disks and the like which have covers which slide up and pivot to form a stand are known in the art. For example, U.S. Pat. Nos. 4,798,284, 4,693,364, and 4,634,001, all by Wakelin, and 4,666,036 by Bourbon all disclose such containers.

None of these patents disclose a cover which is spring biased to pop open when a latch is released. Further, none of these patents disclose a guiding track arrangement for a cover that allows the cover to slide without sticking during opening of the cover.

SUMMARY OF THE INVENTION

The present invention provides a normally closed container for compact disks, the container having a movable cover that is force biased to pop open when a latch is released. After opening, the cover is guided in a manner to slide without sticking, as the cover is manually opened to one of two stable open positions wherein the cover provides a stand for the container, the disks then being supported at a selected one of two different angles that are tilted to the vertical.

An object of the invention is to provide a container for storing compact disks and the like, wherein the container has a base member that defines an open top and open front cavity for housing compact disks as the disks stand with their bottom edge engaging a floor of the cavity. A front panel closes the lower portion of open front of the cavity.

As a feature of the invention, the front panel is pivoted adjacent to the floor of the cavity and carries a latch member at the top edge of the front panel. A mechanical detent provides a stable closed position, and a stable pivoted open position for the front panel.

A generally L-shaped cover closes both the remainder of the cavity front and the cavity top. The bottom edge of the cover contains a slot that cooperates with the latch on the front panel, so as to lock the cover in a closed position. When the cover is thus latched closed, a spring bias force means is loaded to subsequently open the cover when the latch is released from the slot in the cover.

The cover is slidably mounted to the two side walls of the cavity. Each side wall of the cavity contains an inverted U-shaped track and an elongated vertical groove. Cover movement is guided by the two U-shaped tracks and the two vertical grooves.

One of the above-mentioned spring bias force means is associated with each of the vertical grooves in the two side walls of the cavity.

As a feature of the invention, two mechanical detents are provided at similar locations in each of the two U-shaped tracks. These detents establish two different stable open positions for the cover, whereby the cover can be pivoted up and over the cavity top to form a stand for the base member.

Those having normal skill in the art will recognize the foregoing and other objects, features, advantages and applications of the present invention from the following detailed description of the preferred embodiments as illustrated in the accompanying drawings.

BRIEF DESCRIPTION OF THE DRAWINGS

FIG. 1A is a front view of the invention showing both the cover and the front panel in a closed position. FIG. 1B is a right side view of FIG. 1A. FIG. 1C is a bottom view of FIG. 1A.

FIG. 4 is composed of FIG. 4A and FIG. 4B.

FIG. 5 is composed of FIG. 5A and FIG. 5B.

DETAILED DESCRIPTION OF THE PREFERRED EMBODIMENTS

Figure 5A:
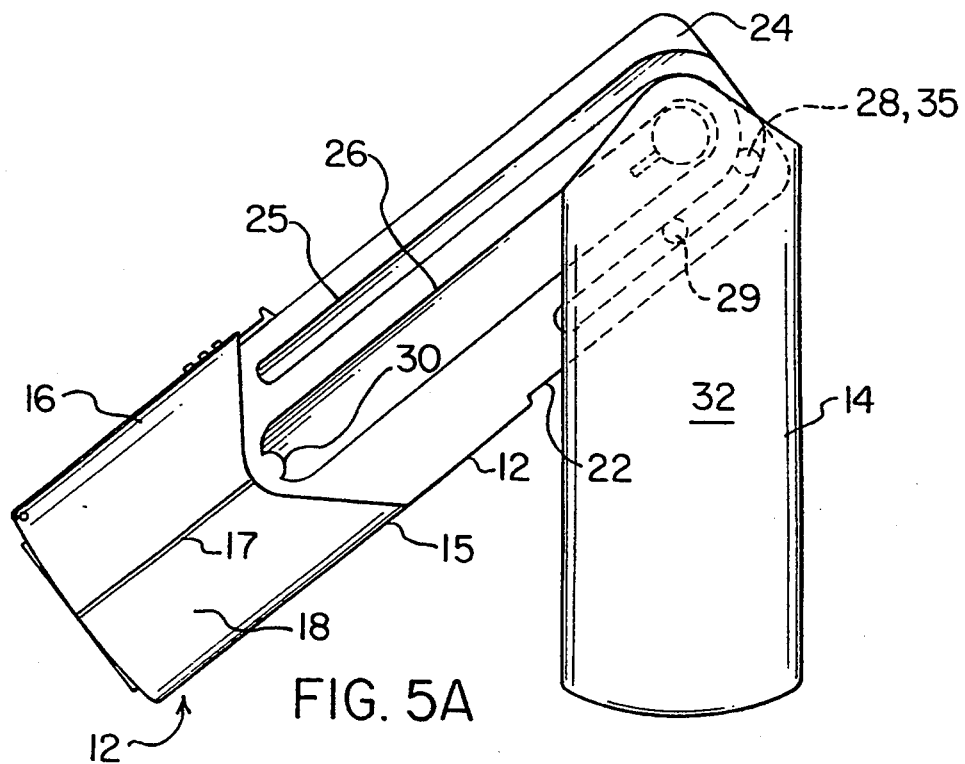
FIG. 5A is a right side view of the invention similar to FIG. 1B, but showing the cover in a first open position wherein the detent protrusions of FIG. 3 are positioned in first detent notches in the C-shaped track.
Figure 5B:
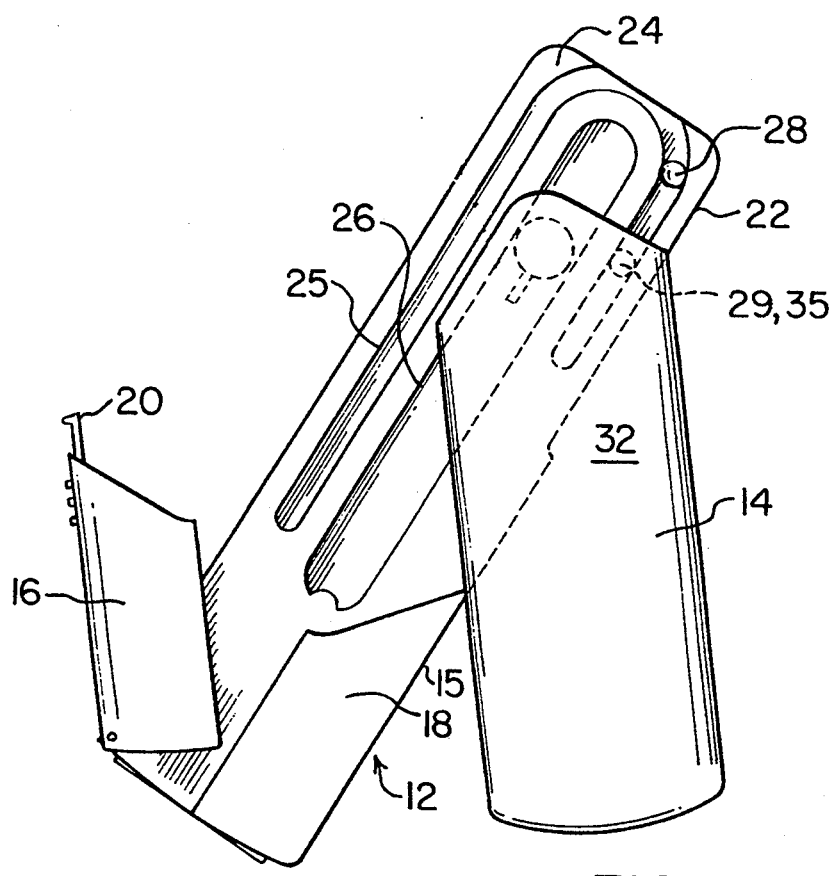
FIG. 5B is a view similar to FIG. 5A, showing the front panel pivoted to an open position, and showing the cover in a second open position wherein the detent protrusions of FIG. 3 are positioned in second detent notches in the C-shaped track.

The present invention provides a normally closed container 10 for compact disks, container 10 having a movable cover 14 that is force biased to pop open slightly when a latch 19,20 is released. After opening, cover 14 is guided in a manner to slide without sticking, as cover 14 is manually opened to one of two stable open positions (shown in FIGS. 5A and 5B), whereat cover 14 provides a stand for container 10, the disks then being supported at one of two different angles to the vertical, as shown in FIGS. 5A and 5B. A front panel 16 is pivoted adjacent to the floor of container 10, and carries a latch member 20 at the top edge thereof. Mechanical detents provide a stable closed position for front panel 16 (shown in FIG. 5A), and a stable pivoted open position for front panel 16, as shown in FIG. 5B.

A CD container 10, constructed and arranged in accordance with the invention, comprises three major parts; i.e., an open top and open front base member 12 that forms a cavity 13 for holding the CDs, a generally L-shaped cover 14 for covering the top and a major portion of the front of the base member, and a pivoted front panel 16 for covering the lower portion of the front of the base member.

Base member 12 is formed by a four generally flat surfaces; i.e., bottom wall 11, a back wall 15 that extends perpendicular to bottom wall 11, and two side walls 23 and 24 that extend perpendicular to back wall 15. Base 12 forms an open front and open top rectangular cavity 13 that is constructed and arranged to hold a number of compact disks (not shown), for example, 12 disks, as the bottom edges of the disks rest on bottom wall 11 of cavity 13.

Cavity 13 is about 13.2 mm horizontally wide, about 14.4 mm vertically high, and about 3.6 mm deep. The top portion 22 of vertical back wall 15 of base member 12, comprising about 5.0 mm in vertical height, is recessed inward about 0.2 mm in order to accommodate a wall 34 of cover 14 in its closed position, the closed position being shown in FIG. 1B.

Vertical side walls 23 and 24 of base 12 each contain a horizontally extending plastic pin 27 (FIG. 2) by which front panel 16 is pivoted to the lower front corner of each of the side walls 23 and 24, thus enabling front panel 16 to pivot to an open position, as shown in FIG. 5B.

The outer surfaces of each of the side walls 23 and 24, and each of the inner surfaces of the adjacent side walls of cover 16, include mechanical detent means (not shown) that facilitates the movement of cover 16 into two stable positions; i.e., the closed position of FIG. 5A and the open position of FIG. 5B.

Figure 2:
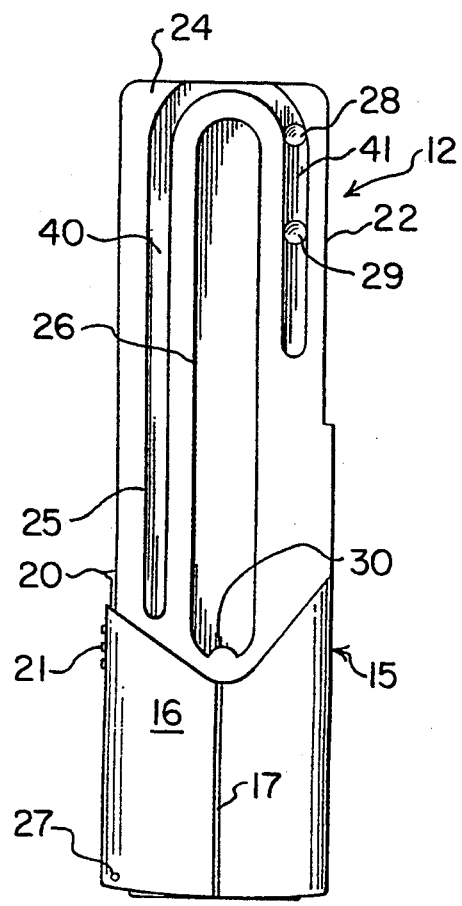
FIG. 2 is a right side view similar to FIG. 1B, but with the cover removed from the base member, and showing the external wall surface construction of the base member's right hand side wall, which construction features an inverted C-shaped track having a pair of detent notches formed in one leg thereof, an elongated vertical groove, and a spring loading protrusion formed at the bottom of the groove.

In addition, the outer, or exterior, surfaces of each of the side walls 23 and 24 of base 12 contain an inverted U-shaped track 25 and an elongated and vertically extending groove 26. FIGS. 2, 5A and 5B show the track 25 and groove 26 that is formed within the base member's right hand side wall 24. Each of the two tracks 25 (i.e., one track in each of the two side walls 23,24) contains a first and a second detent depression, or notch, 28,29 that is formed into the floor of track 25. Notches 28,29 facilitate the opening of cover 14 into two different stable open positions, as shown in FIGS. 5A and 5B.

The track 25 and groove 26 that are formed within the exterior surface of the base member's left-hand side wall 23 is a mirror image of what is shown in FIGS. 2, 5A and 5B for right hand wall 24.

Figure 3:
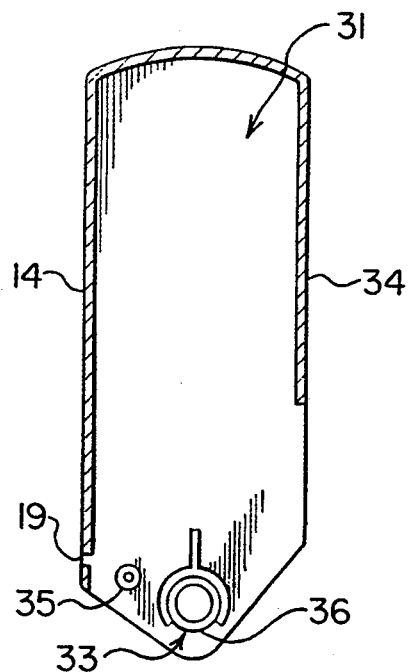
FIG. 3 is a right side section view of the cover wherein the cover's right hand wall has been removed, and showing the internal wall surface construction of the cover's left hand wall, which construction features a detent protrusion that cooperates with the C-shaped track in the base member's left hand side wall, a guide protrusion that cooperates with the vertical groove in the base member's left hand side wall, and an O-shaped spring contained within the guide protrusion, the spring cooperating with the spring loading protrusion at the bottom of the groove in the left hand side wall.

A C-shaped internally-extending spring retaining collar, or wall, 38 is carried by the internal surface of each of the side walls 31 and 32 of cover 14. FIG. 3 shows collar 38 of left hand cover wall 31. In addition, an internally-extending detent post 35 is carried by each of the side walls 31 and 32 of cover 14. FIG. 3 shows detent post 35 of left hand cover wall 31.

Each of the two collars 38 (i.e., one on each of the side walls 31 and 32 of cover 14) is constructed to form a C-shaped and generally circular wall having a downward facing open portion 33. A flat, O-shaped, flexible plastic spring 36 is contained within each of the collars 38. When cover 14 is in the closed position shown in FIG. 1B, spring 36 is depressed radially inward by engagement with a boss, rib, or protrusion 30 that is formed at the lower portion of groove 26 (see FIG. 2). As will be explained, the energy thus stored in the two springs 36 operates to automatically open cover 14 by moving the cover a small distance vertically upward when cover 14 is manually released from front panel 16.

Collar 38, detent post 35 and spring 36 that are carried by the vertical internal surface of the cover's right hand side wall 32 are a mirror image of what is shown in FIG. 3.

Front panel 16 selectively pivots forward to the FIG. 5B position to allow a user to flip through CDs that are contained within container 10. Front panel 16 is flexible and its top edge includes an extending latch piece 20 that releasably fits into a slot 19 adjacent to the bottom edge of cover 14 (see FIGS. 4A and 4B). To release latch 20, the user presses front panel 16 in toward cavity 13 until front panel 16 bends back, pulling latch 20 out of slot 19.

Container 10, without limitation thereto, is preferably made from stiff but flexible plastic, such as ABS or HIPS, so that front panel 16 will bend sufficiently with thumb pressure to release latch 20 from slat 19. Ridges 21, in front cover 16, give the user's thumb purchase to not slide, and also show the user where to press on cover 14 in order to open container 10.

Figure 1:
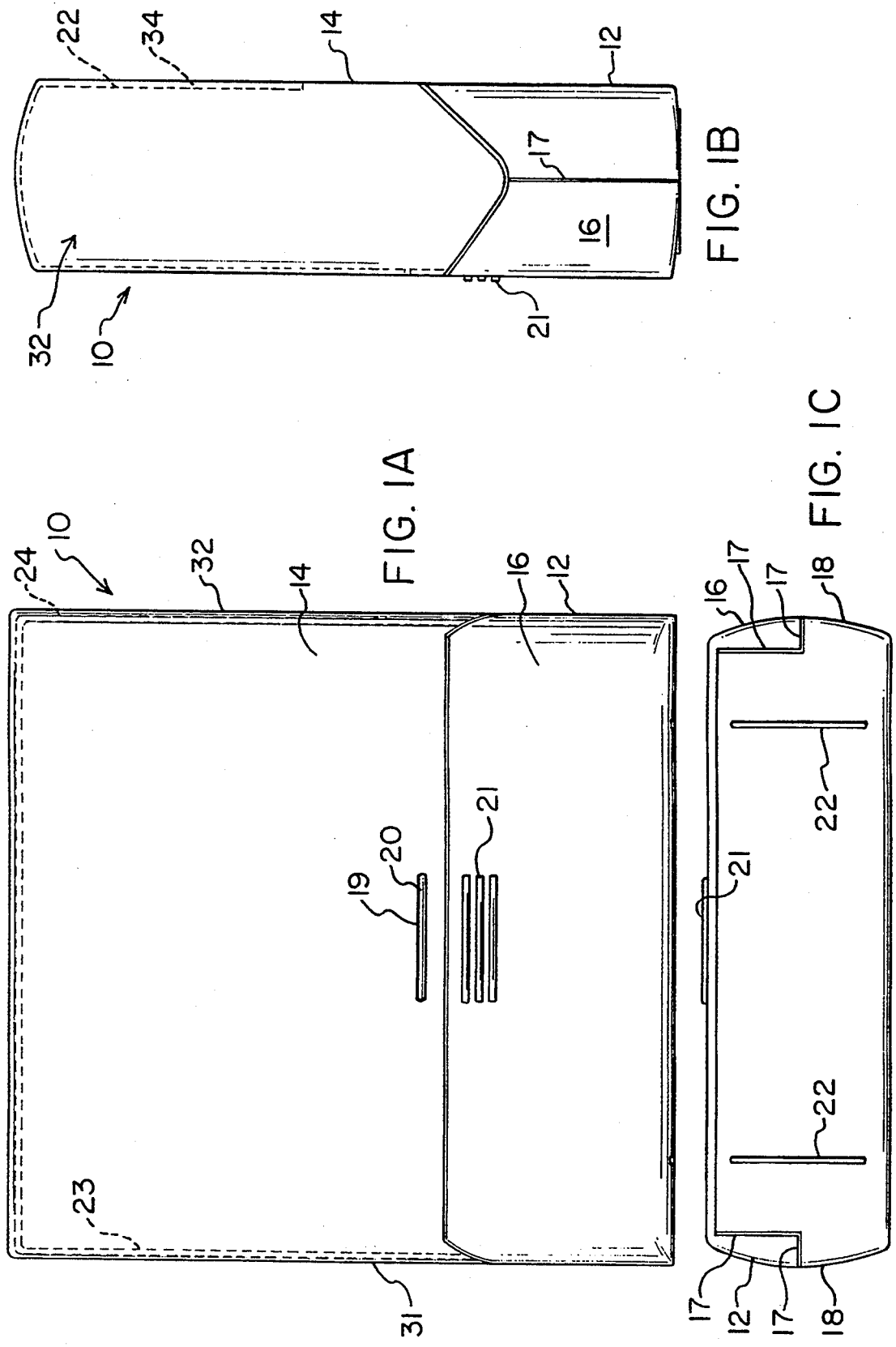
FIG. 1 is composed of FIGS. 1A, 1B, and 1C.

Referring to FIG. 1B, a break 17 between front panel 16 and back member 12 allows front panel 16 to swing forward (see FIG. 4B) on hinge pins 27 that are located at the bottom/front of base member 12.

Ridges 22, shown in FIG. 1C, allow container 10 to stand vertically upright on a horizontal surface.

As shown in FIG. 2, each of the two outside side walls 23,24 of base member 12 contains an inverted U-shaped track 25, and an elongated and vertical groove 26 is contained within the U-shaped track. Each U-shaped track includes a first vertical leg 40 that is located adjacent to the open front of cavity 13, and a second vertical leg 41 that is located adjacent to the back wall 15 of base member 12.

U-shaped track 25 guides detent protrusions 35 on the interior of the side walls of cover 14, as cover 14 pivots clockwise (relative to FIG. 1B) and slides up and then pivots back over the top of base member 12. The two pairs of detent notches 28,29, located within tracks 25, provide two mechanically stable stopping points for cover 14. FIGS. 5A and 5B show the two open positions of cover 14.

Grooves 26 guide collars 38 (shown in FIG. 3). The combination of tracks 25 and grooves 26 maintains cover 14 parallel while the cover is sliding upward and pivoting back over base member 12, thus preventing cover 14 from being misaligned and sticking.

The small protrusion 30, at the bottom of groove 26, holds tension on spring 36 (shown in FIG. 3) so long as latch means 19,20 maintains cover 14 latched to front panel 16 When latch means 19,20 is released, cover 14 is forced upward and opens slightly (i.e., move clockwise relative to FIG. 2) by spring 36 pressing against protrusion 30.

FIG. 3 shows cover 14 with the right hand wall 32 removed. Thus, spring 36 and spring retaining collar 38 are visible on the interior surface of the left hand wall 31. As noted, a similar mirror image spring 36 and collar 38 are located on the inside surface of the right hand side wall 32 of cover 14. Spring 36 presses against protrusion 30 when cover 14 is closed and latched. In the preferred embodiment, spring 36 is a piece of springy plastic such as Delron or Santoprene that is formed in a circle. When spring 36 is pressed by protrusion 30, spring 36 is pressed and forced to a noncircular configuration. When latch means 19,20 is released, spring 36 opens to its original O-shaped configuration, pushing protrusion 30 downward. Thus, cover 14 moves slightly upward to an open position, preventing latch 20 from relatching. Spring retaining collar 38 has two purposes; i.e., it provides a housing for spring 36, and it fits into groove 26 to guide cover 14 while cover 14 slides up and pivots back relative to base member 12.

Figure 4A:
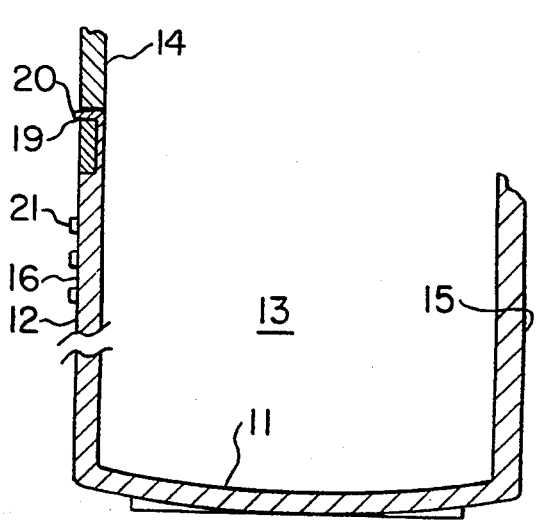
FIG. 4A is a right side section view showing the cover in a latched position on the front panel shown in FIG. 2, the cover being held by a manually movable latch that is carried by the front panel.
Figure 4B:
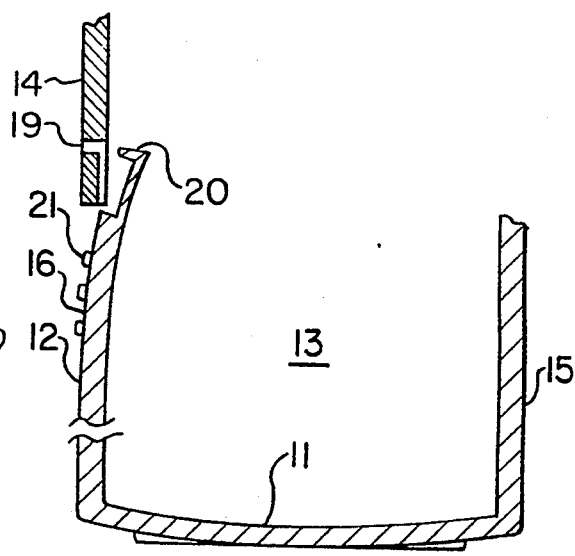
FIG. 4B is a right side section view similar to FIG. 4A, but showing the front wall of the front panel bent inward to latch the cover, due to manual inward flexing of the front wall of the front panel.

FIG. 4 is composed of FIG. 4A and FIG. 4B. FIG. 4A shows latch 20 latched to slot 19. Latch 20 is preferably a triangular-shaped piece of plastic integrally formed with front panel 16. FIG. 4B shows the unlatched configuration of 19,20. The user presses front panel 16 backward, pulling latch 20 out of slot 19.

FIG. 5 is composed of FIGS. 5A and 5B. FIG. 5A shows container 10 in a first open position wherein detent protrusions 35 are nested in upper detent notches 28. Base member 12 now leans back to rest on cover 14 which forms a stand. FIG. 5B shows container 10 in a second open position, wherein detent protrusions 35 are located in lower detent notches 29, resulting in a less tilted position of base member 12. FIG. 5B also shows front panel 16 pivoted open to allow a user to browse through the compact disks contained in container 10.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. A container for compact disks, comprising;
   a base member having a vertical back wall, a horizontal bottom wall, and first and second vertical side walls defining an open top and open front cavity for said compact disks,
   an inverted and generally U-shaped track in each of said side walls,
   a cover for said base member adapted to substantially cover said open top and said open front of said base member, said cover having a vertical front wall, a horizontal top wall, and first and second vertical side walls,
   protrusion guide means carried by each of said side walls of said cover and cooperating with said U-shaped track in each of said side walls of said base member,
   latch means associated with said base member and said cover and operable to latch said cover in a closed position with said cover substantially covering said open top and said open front of said base member, and
   spring force means associated with said base member and said cover and operable to be force loaded when said cover is in said closed position,
   such that operation of said latch means operates to move said cover vertically up and away from said closed position as a result of said force loading of said spring force means,
   whereupon said vertical front wall of said cover may be rotated vertically upward and over said top wall of said base member, as said guide means moves in said U-shaped tracks, said cover then forming a stand whereby said back wall of said base member is tilted to a nonvertical position.

2. The container of claim 1 wherein a first side wall of said cover cooperates with a first side wall of said base member, and a second side wall of said cover cooperates with a second side wall of said base member, said container including;
   a first and a second similar spring,
   a first and a second similar spring loading means,
   said first spring and said first spring loading means being associated with said first side wall of said cover and said first side wall of said base member, and
   said second spring and said second spring loading means being associated with said second side wall of said cover and said second side wall of said base member,
   to thereby provide uniform force loading of said cover when said cover is in said closed position.

3. The container of claim 1 wherein a first side wall of said cover overhangs a first side wall of said base member, and a second side wall of said cover overhangs a second side wall of said base member, said container including;
   a first and a second spring having similar spring characteristics, one spring being carried by each of said side walls of said cover, and
   a first and a second spring loading means having similar spring loading characteristics, one spring loading means being carried by each of said side walls of said base member, whereupon when said cover is moved to said closed position each of said first and second springs is similarly force loaded.

4. The container of claim 1 wherein each of said inverted and generally U-shaped tracks in each of said side walls includes a first vertical leg that is located adjacent to said open front of said base member, and a second vertical leg that is located adjacent to said back wall of said base member, said container including;

a first and a second detent means located at a first similar location and a second similar location in each of said second vertical legs of each of said U-shaped tracks, said first and second detent means cooperating with said protrusion guide means carried by each of said side walls of said cover to selectively provide two different stand positions of said cover whereby said back wall of said base member is selectively tilted to one of two different nonvertical positions.

5. The container of claim 4 wherein a first side wall of said cover cooperates with a first side wall of said base member, and a second side wall of said cover cooperates with a second side wall of said base member, said container including;

a first and a second similar spring, a first and a second similar spring loading means, said first spring and said first spring loading means being associated with said first side wall of said cover and said first side wall of said base member, and said second spring and said second spring loading means being associated with said second side wall of said cover and said second side wall of said base member, to thereby provide uniform force loading of said cover when said cover is in said closed position.

6. The container of claim 4 wherein a first side wall of said cover overhangs a first side wall of said base member, and a second side wall of said cover overhangs a second side wall of said base member, said container including;

a first and a second spring having similar spring characteristics, one spring being carried by each of said side walls of said cover, and a first and a second spring loading means having similar spring loading characteristics, one spring loading means being carried by each of said side walls of said base member, whereupon when said cover is moved to said closed position each of said first and second springs is similarly force loaded.

7. The container of claim 1 wherein said vertical front wall of said cover includes a bottom edge, said container including;

a flexible and vertical front panel hinged to said first and second side walls of said base member, said front panel having a top edge positioned adjacent to said bottom edge of said cover, and said front panel operating to close a bottom portion of said open front of said cavity, wherein said latch means comprises, a slot carried by said vertical front wall of said cover adjacent to said bottom edge, and a protruding catch carried by said front panel adjacent to said top edge thereof, said catch entering said slot when said cover is in said closed position, and said catch being selectively withdrawn from said slot upon flexing of said front panel.

8. The container of claim 7 wherein each of said inverted and generally U-shaped tracks in each of said side walls includes a first vertical leg that is located adjacent to said open front of said base member, and a second vertical leg that is located adjacent to said back wall of said base member, said container including;

a first and a second detent means located at a first similar location and a second similar location in each of said second vertical legs of each of said U-shaped tracks, and said first and second detent means cooperating with said protrusion guide means carried by each of said side walls of said cover to selectively provide two different stand positions of said cover whereby said back wall of said base member is selectively tilted to one of two different nonvertical positions.

9. The container of claim 8 wherein a first side wall of said cover cooperates with a first side wall of said base member, and a second side wall of said cover cooperates with a second side wall of said base member, said container including;

a first and a second similar spring, a first and a second similar spring loading means, said first spring and said first spring loading means being associated with said first side wall of said cover and said first side wall of said base member, and said second spring and said second spring loading means being associated with said second side wall of said cover and said second side wall of said base member, to thereby provide uniform force loading of said cover when said cover is in said closed position.

10. The container of claim 8 wherein a first side wall of said cover overhangs a first side wall of said base member, and a second side wall of said cover overhangs a second side wall of said base member, said container including;

a first and a second spring having similar spring characteristics, one spring being carried by each of said side walls of said cover, and a first and a second spring loading means having similar spring loading characteristics, one spring loading means being carried by each of said side walls of said base member, whereupon when said cover is moved to said closed position each of said first and second springs is similarly force loaded.

11. A container for a plurality of compact disks and the like, said disks having similar planar areas, the container comprising;

a base member having an open top and an open front, said base member being defined by a generally flat and rectangular back wall having a top edge, a bottom edge, and first and second side edges, said edges defining an area to accommodate the planar area of said compact disks, a generally flat and rectangular bottom wall fixed to the bottom edge of said back wall and extending generally perpendicular to said back wall, said bottom wall having a dimension perpendicular to said back wall to accommodate said plurality of compact disks whose planar areas mutually engage, a first generally flat and rectangular side wall fixed to said first side edge of said back wall and extending generally perpendicular to said back wall, said first side wall having a dimension perpendicular to said back wall that is generally equal to said perpendicular dimension of said bottom wall, and a second generally flat and rectangular side wall fixed to said second side edge of said back wall and extending generally perpendicular to said back wall, said second side wall having a dimension perpendicular to said back wall that is generally equal to said perpendicular dimension of said bottom wall, a cover for said base member, said cover having an open bottom and a generally open back, said cover being movable to a closed position relative to said base member, and said cover being defined by a generally flat and rectangular front wall having a top edge, a bottom edge, and first and second side edges, said edges defining a planar area generally equal to said area of said back wall of said base member, a generally flat and rectangular top wall fixed to the top edge of said front wall and extending generally perpendicular to said front wall, said top wall having a dimension perpendicular to said front wall to accommodate said plurality of compact disks whose planar areas mutually engage, a first generally flat and rectangular side wall fixed to said first side edge of said back wall and extending generally perpendicular to said back wall, said first side wall having a dimension perpendicular to said back wall that is generally equal to said perpendicular dimension of said bottom wall, and a second generally flat and rectangular side wall fixed to said second side edge of said back wall and extending generally perpendicular to said back wall, said second side wall having a dimension perpendicular to said back wall that is generally equal to said perpendicular dimension of said bottom wall, two springs, one spring being carried by each of said side walls of said cover, and two spring loading means, one spring loading means being carried by each of said side walls of said base member, whereupon when said cover is moved to said closed position each of said two springs is force loaded.

12. The container of claim 11 wherein said side walls of said cover overhang said side walls of said base member, said container including;

an inverted, U-shaped track in each of said side walls of said base member, said U-shaped tracks facing said side walls of said cover, an elongated vertical groove in each of said side walls of said base member, each of said grooves occupying a space generally within said U-shaped track in each of said side walls of said base member, said two spring loading means comprising a portion of said grooves adjacent to said bottom wall containing a spring stressing protuberance, and said springs being carried by said side walls of said cover facing said side walls of said base member.

13. The container of claim 12 wherein each of said U-shaped tracks includes a first leg adjacent to said open front of said base member and a second leg adjacent to said back wall of said base member, said container including;

a protrusion guide means located on each of said side walls of said cover adjacent to said side walls of said base member, each of said protrusion guide means being slidably engaged in an adjacent one of said U-shaped tracks, and a first and a second detent located at first and second similar positions in each of said second legs of said U-shaped tracks, whereby said vertical front wall of said cover may be rotated vertically upward and over said top wall of said base member, said cover then forming a stand whereby said back wall of said base member is tilted to one of two nonvertical positions as said protrusion guide means cooperates with said first or said second detent.

14. The container of claim 13 wherein said vertical front wall of said cover includes a bottom edge, said container including;

a flexible and vertical front panel hinged to said first and second side walls of said base member, said front panel having a top edge positioned adjacent to said bottom edge of said cover, and said front panel operating to close a bottom portion of said open front of said cavity, a slot carried by said vertical front wall of said cover adjacent to said bottom edge, and a protruding catch carried by said front panel adjacent to said top edge thereof, said catch entering said slot when said cover is in said closed position, and said catch being selectively withdrawn from said slot upon flexing of said front panel.

15. The container of claim 11 wherein said side walls of said cover overhang said side walls of said base member, said container including;

an elongated vertical groove in each of said side walls of said base member, said vertical grooves facing said side walls of said cover, said two spring loading means comprising a portion of said grooves adjacent to said bottom wall containing an upward extending spring stressing protuberance, a generally circular and C-shaped wall carried by each of said side walls of said cover, each of said C-shaped walls having an opening facing vertically downward, and each of said C-shaped walls being slidably engaged in an adjacent elongated vertical groove, such that when said cover is in said closed position said spring stressing protuberance enters said opening in its adjacent C-shaped wall, and said two springs being located one spring within each of said two C-shaped walls.

16. The container of claim 15 including;

an inverted, U-shaped track in each of said side walls of said base member, said U-shaped tracks facing said side walls of said cover, each of said U-shaped tracks including a first leg adjacent to said open front of said base member and a second leg adjacent to said back wall of said base member, a guide protrusion located on each of said side walls of said cover adjacent to said side walls of said base member, each of said protrusions being slidably engaged in an adjacent one of said U-shaped tracks, and a first and a second detent located at first and second similar positions in each of said second legs of said U-shaped tracks, whereby said vertical front wall of said cover may be rotated vertically upward and over said top wall of said base member, as said protrusions move upward in said first leg of said U-shaped tracks, and then move downward in said second leg of said U-shaped tracks, said cover forming a stand whereby said back wall of said base member is tilted to one of two nonvertical positions as said protrusions cooperate with said first or said second detent in said second leg of said U-shaped tracks.

17. The container of claim 16 wherein said vertical front wall of said cover includes a bottom edge, said container including;
- a flexible and vertical front panel hinged to said first and second side walls of said base member, said front panel having a top edge positioned adjacent to said bottom edge of said cover, and said front panel operating to close a bottom portion of said open front of said cavity,
- a slot carried by said vertical front wall of said cover adjacent to said bottom edge, and
- a protruding catch carried by said front panel adjacent to said top edge thereof,
- said catch entering said slot when said cover is in said closed position, and said catch being selectively withdrawn from said slot upon flexing of said front panel.

* * * * *